(12) United States Patent  
Hendren et al.

(10) Patent No.: US 7,029,069 B2
(45) Date of Patent: *Apr. 18, 2006

(54) CHILD SAFETY SEAT

(75) Inventors: Ronald D. Hendren, Hopkins, MN (US); Gardell W. Bearl, New Hope, MN (US)

(73) Assignee: Universal Technologies, Inc., Hopkins, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/890,587

(22) Filed: Jul. 14, 2004

(65) Prior Publication Data

US 2005/0236877 A1 Oct. 27, 2005

Related U.S. Application Data

(63) Continuation-in-part of application No. 10/762,419, filed on Jan. 22, 2004, now Pat. No. 6,938,954.

(60) Provisional application No. 60/442,163, filed on Jan. 22, 2003.

(51) Int. Cl.
*A47D 1/10* (2006.01)

(52) U.S. Cl. .................................. 297/256.12

(58) Field of Classification Search ............... 297/254, 297/216.11, 250.1, 470, 256.1, 256.12, 256.16, 297/240, 242, 344.24, 475, 253; 248/346.04
See application file for complete search history.

(56) References Cited

U.S. PATENT DOCUMENTS

| | | | |
|---|---|---|---|
| 4,971,392 A | 11/1990 | Young | |
| 5,390,978 A * | 2/1995 | Janisch | 297/240 |
| 5,480,210 A | 1/1996 | Lehenbauer et al. | |
| 5,839,789 A * | 11/1998 | Koledin | 297/476 |
| 6,045,183 A | 4/2000 | Weber | |
| 6,095,604 A * | 8/2000 | Stack et al. | 297/254 |
| 6,186,573 B1 | 2/2001 | Thurab | |
| 6,196,629 B1 | 3/2001 | Onishi et al. | |
| 6,241,314 B1 | 6/2001 | Pufall | |
| 6,322,142 B1 * | 11/2001 | Yoshida et al. | 297/250.1 |
| 6,412,865 B1 | 7/2002 | Bedard | |
| 6,431,647 B1 | 8/2002 | Yamazaki | |
| 6,517,154 B1 * | 2/2003 | Sawamoto | 297/216.11 |
| 6,554,357 B1 * | 4/2003 | Moffa | 297/254 |
| 6,564,895 B1 * | 5/2003 | Bohmler | 297/470 |
| 6,572,189 B1 | 6/2003 | Blaymore | |
| 6,619,752 B1 * | 9/2003 | Glover | 297/470 |
| 6,623,074 B1 | 9/2003 | Asbach et al. | |
| 6,869,141 B1 * | 3/2005 | Yamaoka et al. | 297/254 |
| 2002/0000744 A1 * | 1/2002 | Maciejczyk | 297/254 |
| 2003/0151281 A1 * | 8/2003 | Williams | 297/250.1 |
| 2004/0051356 A1 * | 3/2004 | Neelis | 297/253 |
| 2005/0006934 A1 * | 1/2005 | Rabeony et al. | 297/250.1 |

FOREIGN PATENT DOCUMENTS

EP 270035 A2 * 6/1988

* cited by examiner

*Primary Examiner*—Milton Nelson, Jr.
(74) *Attorney, Agent, or Firm*—Haugen Law Firm PLLP

(57) ABSTRACT

A child safety seat for use in combination with a vehicular seat includes a retractable harnessing apparatus for securing the child safety seat to the vehicular seat. The retractable harnessing apparatus has a safety strap retractably extending out from the strap housing, and is integrally mounted within the child safety seat. The retractable harnessing apparatus further includes a locking mechanism for responsively locking the safety strap in a fixed degree of extension from the housing upon incursion of a sudden force urging the safety strap out from the housing.

4 Claims, 12 Drawing Sheets

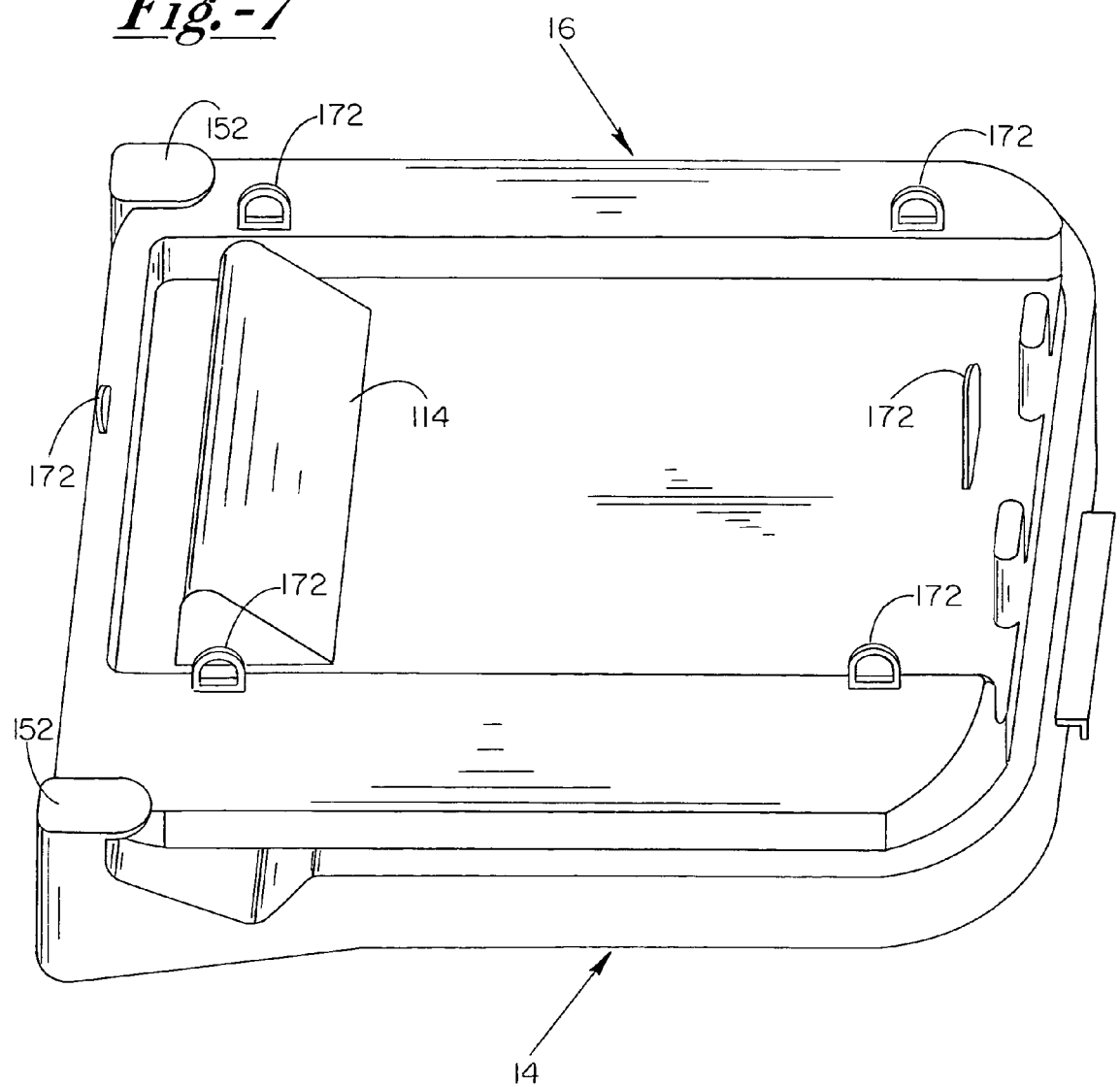

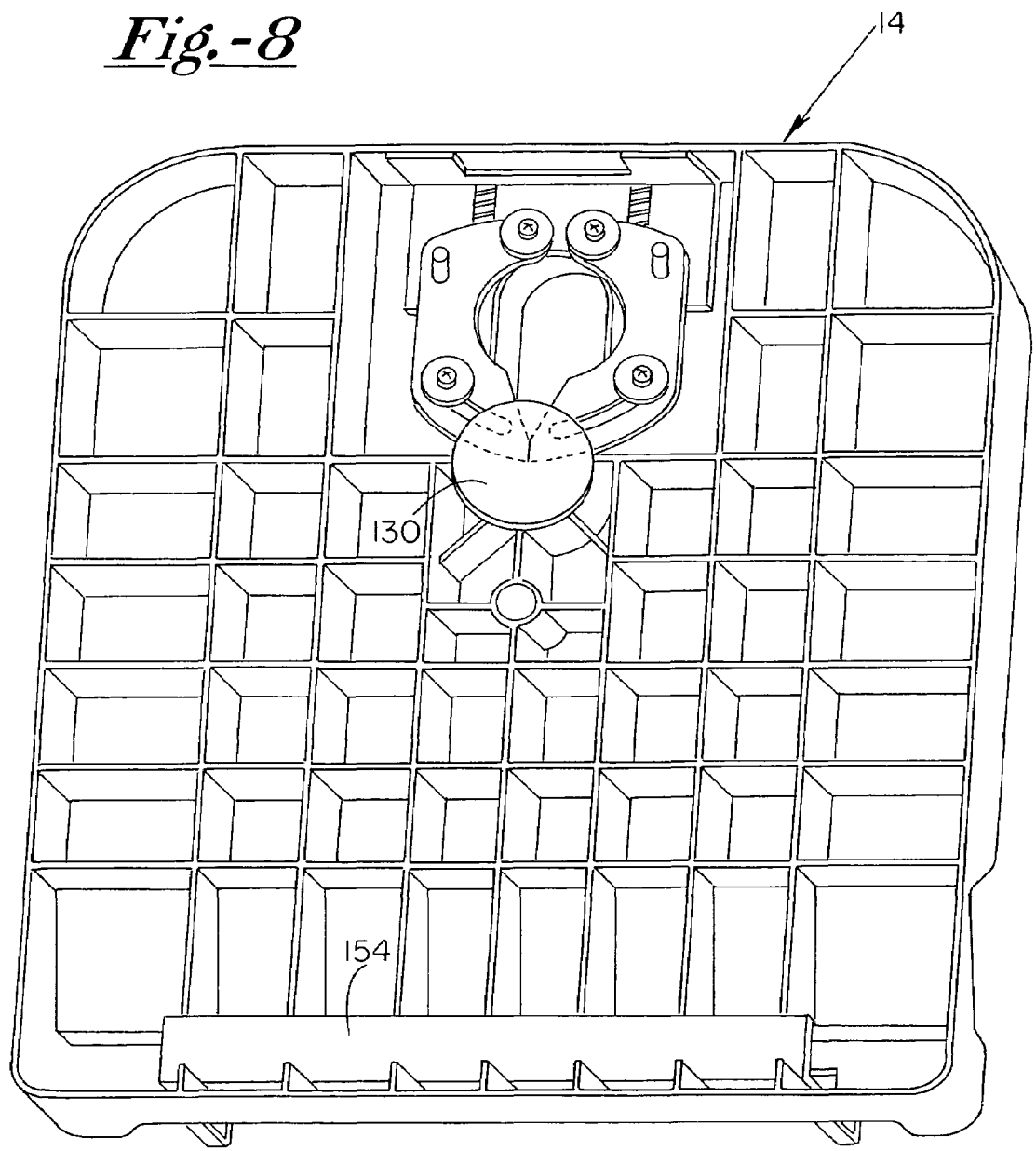

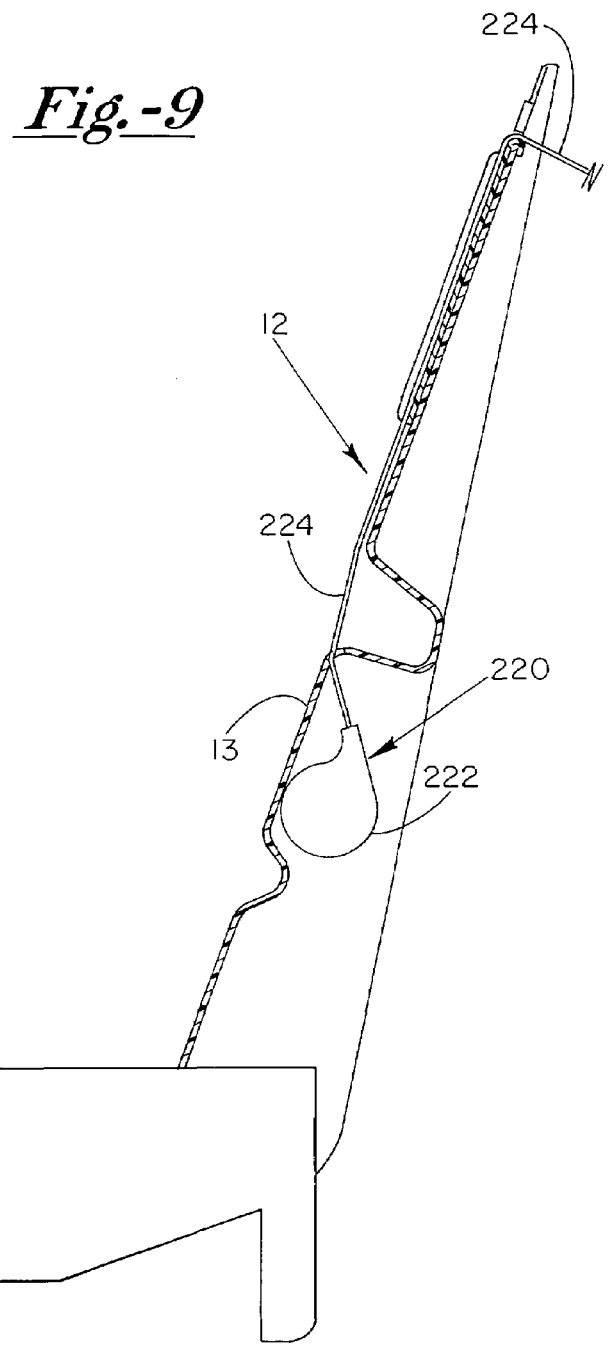

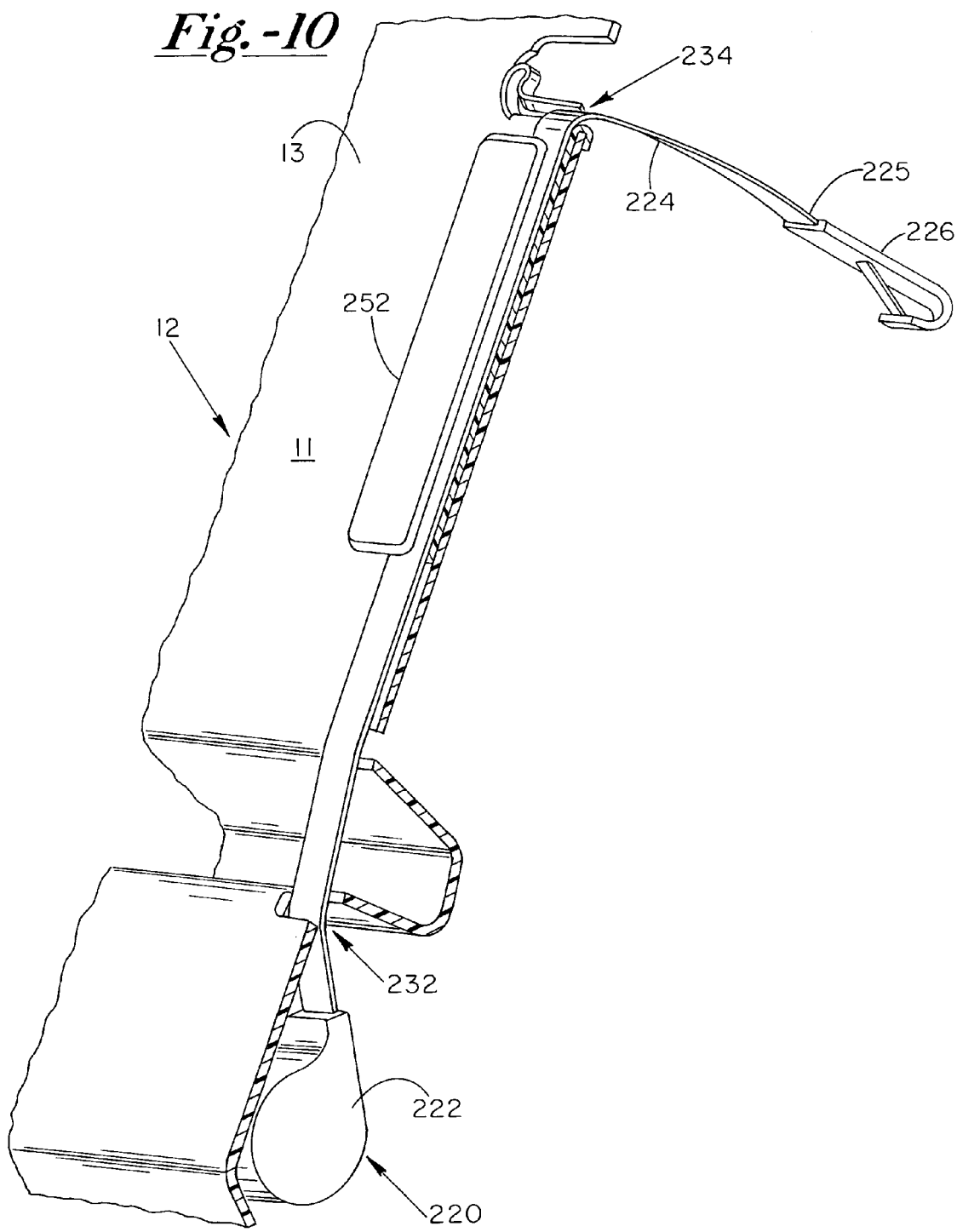

CHILD SAFETY SEAT

CROSS-REFERENCE TO RELATED APPLICATION

This application is a continuation-in-part of U.S. application Ser. No. 10/762,419, filed on Jan. 22, 2004, now U.S. Pat. No. 6,938,954 and entitled ROTATABLE CHILD SAFETY SEAT, which itself claims priority from U.S. provisional application Ser. No. 60/442,163, filed on Jan. 22, 2003 and entitled CHILD SAFETY SEAT, the contents of such applications are incorporated herein in their entirety.

FIELD OF THE INVENTION

The present invention relates to child safety seats generally, and more particularly to a child safety seat which incorporates a retractable tie-down safety strap system in the seat structure.

BACKGROUND OF THE INVENTION

Infant and child vehicular safety seats have become widely available since legislation was passed in the United States making use of such safety seats mandatory in the automotive transportation of infants and small children. The tremendous demand for vehicular safety seats has resulted in continual refinements and improvements to initial designs. One such improvement is the adoption of standardized seat sizing for enhanced modularity and portability of such seats for use in applications outside the automobile. For example, conventional infant vehicular safety seats typically are configured so as to be removably mountable to a base member that is secured in place in the respective vehicle via seat belts or other latch means, as well as to strollers and the like.

As a result, many presently-utilized vehicular safety seats incorporate a distinct base unit that is intended to remain securely positioned in the vehicle while the seat element may be selectively secured thereto. The seat element itself, therefore, may be utilized as a child carrying apparatus, and used alone or in combination with mating base structures such as a vehicular base unit, a stroller, a shopping cart, or the like. Such a feature adds significant utility to child safety seats.

Another feature that has been addressed in certain vehicular safety seat designs is that of a pivotable characteristic to the seat. In such a manner, the safety seat may be rotated while remaining in a secured relationship within the vehicle. The user may therefore load and unload the child from the safety seat in a more convenient fashion.

The rotatable vehicular safety seats proposed to date, however, comprise relatively complex assemblies that are expensive to manufacture. Typically, such assemblies require uniquely manufactured components to operate as designed. Moreover, such components fail to provide compatibility to conventional systems.

It is therefore a principle object of the present invention to provide a vehicular child safety seat mounting apparatus that enables rotational mounting of a conventional child safety seat thereto.

It is another object of the present invention to provide a rotatable child safety seat mounting apparatus that enables a conventional child safety seat to rotate along a plane parallel with its base while the seat is securely connected to the vehicle seats.

It is a further object of the present invention to provide a rotatable vehicular child safety seat mounting apparatus that is compatible with conventional child safety seats.

It is a still further object of the present invention to provide a rotatable vehicular child safety seat mounting apparatus that is relatively inexpensive to manufacture.

It is another object of the present invention to provide a child safety seat having a retractable harnessing means incorporated therewith for securing the child safety seat to a corresponding vehicular seat.

SUMMARY OF THE INVENTION

By means of the present invention, a vehicular child safety seat is provided which incorporates a retractable harnessing apparatus for operably securing the child safety seat to the corresponding vehicular seat. The retractable harnessing apparatus allows the user to adjustably position the child safety seat in a secured orientation with respect to the vehicular seat without the need to manually adjust respective safety strap lengths. As such, the retractable/extendable nature of the harnessing apparatus of the present invention facilitates ease of securement of the safety strap to securing receptacles attached to the vehicle, without compromising the effectiveness of the safety strap in the event of an automobile accident.

In a particular embodiment of the present invention, the child safety seat of the present invention includes a retractable harnessing apparatus for securing the child safety seat to a vehicular seat, with the retractable harnessing apparatus having a safety strap that is retractably extended out from a strap housing. The retractable harnessing apparatus is preferably integrally mounted within the child safety seat, and includes a locking mechanism for responsively locking the safety strap in a fixed degree of extension from the housing upon a sudden force urging the safety strap out from the housing.

In certain embodiments, the child safety seat of the present invention is specifically configured to be removably matingly engageable with a rotatable mounting apparatus.

BRIEF DESCRIPTION OF THE DRAWINGS

FIG. 7 is a top perspective view of the combination of an interface structure and a base structure of the present invention.

FIG. 8 is a bottom view of the assembly illustrated in FIG. 7.

FIG. 9 is a cut-away side view of a child safety seat of the present invention.

FIG. 10 is a partial cut-away perspective view of a child safety seat of the present invention.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
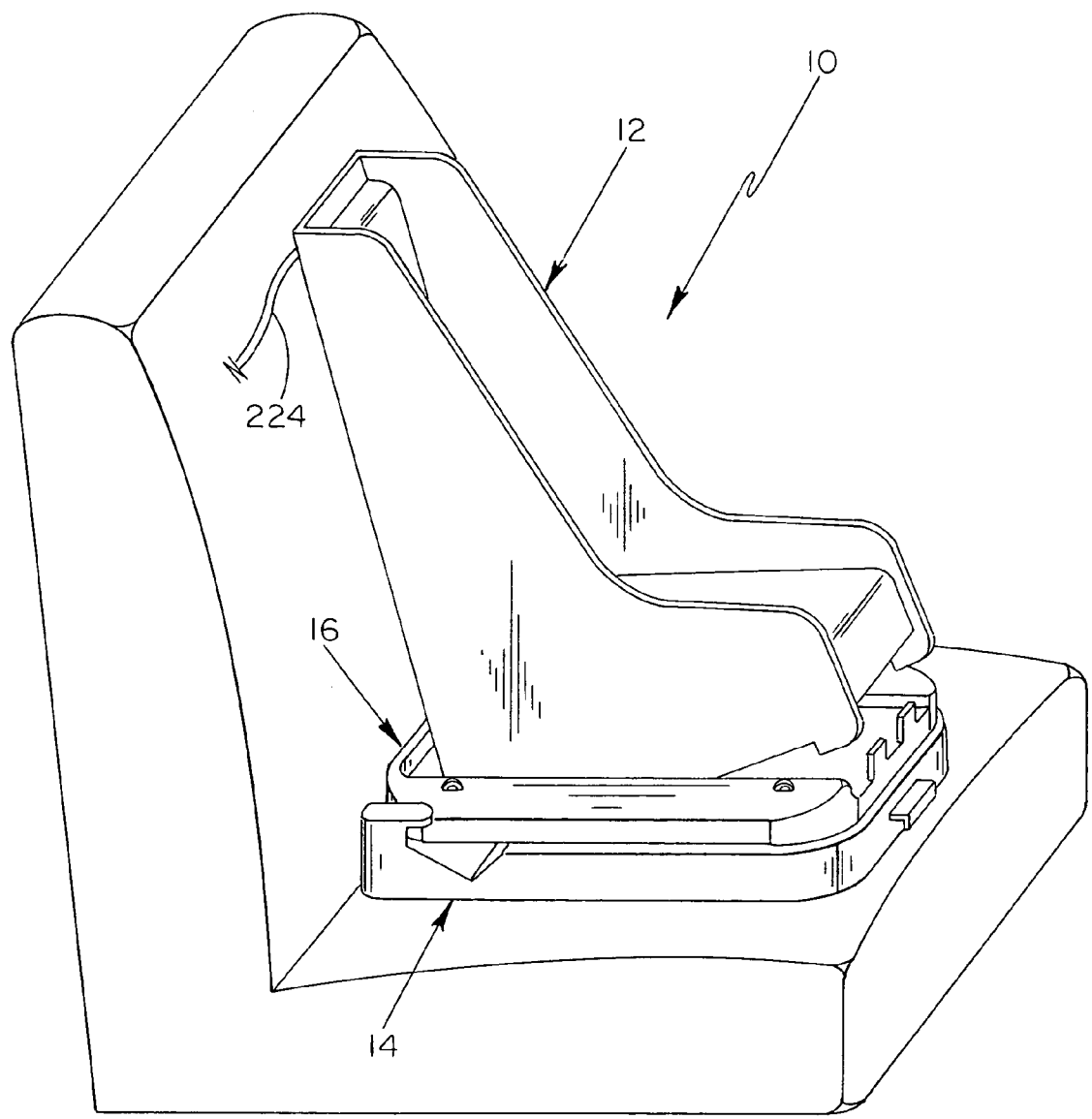
FIG. 1 is a perspective view of the mounting apparatus of the present invention having a vehicular child safety seat operably engaged therewith.

Referring now by characters of reference to the drawings, and first to FIG. 1, a child safety seat apparatus 10 is shown including a seat 12, a base portion 14, and an interface portion 16. Seat 12 is preferably removably secured to interface portion 16, while interface portion 16 is rotatably and slidably secured to base portion 14. Seat 12 may be configured with a conventional undersurface arrangement that is capable of being removably mounted to interface portion 16.

Interface portion 16 is preferably configured to be adaptable to conventional infant or child safety seat undersurface arrangements. In other embodiments, seat 12 may be specially designed for particular use with interface portion 16 of the present invention. In such embodiments, the bottom surface of seat 12 is preferably configured to removably engage with interface portion 16. The present invention further contemplates the utilization of safety harnessing belts incorporated into the seat, and which are anchored to the vehicular seat for further securing apparatus 10 in place. The harnessing apparatus preferably includes means for automatically locking the safety harnessing belts upon the incursion of a predetermined degree of separation force between the child safety seat and the vehicular seat.

In a particular embodiment of such a harnessing apparatus, as illustrated in FIG. 9, seat 12 of the present invention preferably includes a retractable harnessing apparatus 220 operably coupled thereto. In particular, harnessing apparatus 220 includes a strap housing 222 that is preferably integrally mounted within the perimetorial confines of seat 12, and more preferably within seatback 13. Housing 222 of harnessing apparatus 220 preferably encloses a winding of safety strap material 224, with such a safety strap 224 extensably and retractably coupled to a spool within housing 222. As a result, safety strap 224 retractably extends out from housing 222 in a preferred fashion so as to be in a disposition convenient for securement with latching features of a corresponding vehicular seat.

In the partial cut-away view of FIG. 10, seatback 13 of child safety seat 12 preferably includes lower and upper apertures 232, 234 extending therethrough and being sized and configured to allow the passage of safety strap 224 therethrough. Lower and upper apertures 232, 234 in seatback 13 are preferably sufficiently spaced apart so that safety strap 224 bears against a substantial length of front surface 11 of seatback 13 while in operable threaded disposition through lower and upper apertures 232, 234. As a consequence, safety strap 224 acts as a restraint to movement of seat 12 when safety strap 224 is operably secured to a tie-down element of the vehicle.

To effect affixation of safety strap to the corresponding vehicular seat, harnessing apparatus 220 preferably includes an attachment device 226 such as a hook, or the like, secured to a distal end 225 of safety strap 224. Attachment device 226 operably couples to an anchoring utility either in the vehicular seat or otherwise attached to the vehicular frame. In recent model vehicles, the federal government has mandated the installation of "LATCH" anchoring elements which are specifically designed to operably attach to devices such as attachment device 226 of the present invention for operably anchoring child safety seats to a corresponding vehicular seat.

In the embodiment illustrated in FIGS. 9 and 10, safety strap 224 is operably threaded through both lower and upper apertures 232, 234 so as to facilitate attachment to a LATCH-type anchoring element, particularly at or near an upper portion of the seat, when child safety seat 12 is in a forward-facing orientation. The mounting apparatus of the present invention contemplates the utilization of child safety seat 12 in either a rearwardly or forwardly facing orientation during use.

Housing 222 of harnessing apparatus 220 preferably includes a locking mechanism integrated therewith for responsively locking safety strap 224 in a fixed degree of extension from housing 222 upon incursion of a sudden force urging safety strap 224 out from housing 222. For example, safety strap 224 is preferably mounted in housing 222 so as to be relatively freely extensible and retractable therefrom, even while attachment device 226 is operably secured to an anchoring element in the corresponding vehicle. Such a relatively free extensibility and retractability characteristic of safety strap 224 enables the user to operable secure attachment device 226 to a corresponding LATCH-type element without time-consuming manual adjustment to a fixed length of safety strap 224. Moreover, the relatively free extensibility and retractability characteristic of safety strap 224 enables seat 12 to be operably secured to a rotatable mounting apparatus that provides for the operable rotation of seat 12 while secured to the corresponding vehicular seat. Thus, safety seat 12 may be rotated about a plane defined by seat portion 15 thereof without having to disengage safety strap 224 from respective anchoring elements in the corresponding vehicular seat.

In addition to the above, the locking mechanism provided in housing 222 of harnessing apparatus 220 acts as a lockable ratchet system for locking safety strap 224 in place when a sudden force is imparted upon safety strap 224 to pull such strap 224 out from housing 222, such as would be the case if seat 12 of the present invention were involved in an accident urging seat 12 forward and away from the corresponding vehicular seat.

Retractable safety strap assemblies like those utilized in apparatus 10 of the present invention are available from Beam's Industries of Oklahoma City, Okla.

Figure 11:
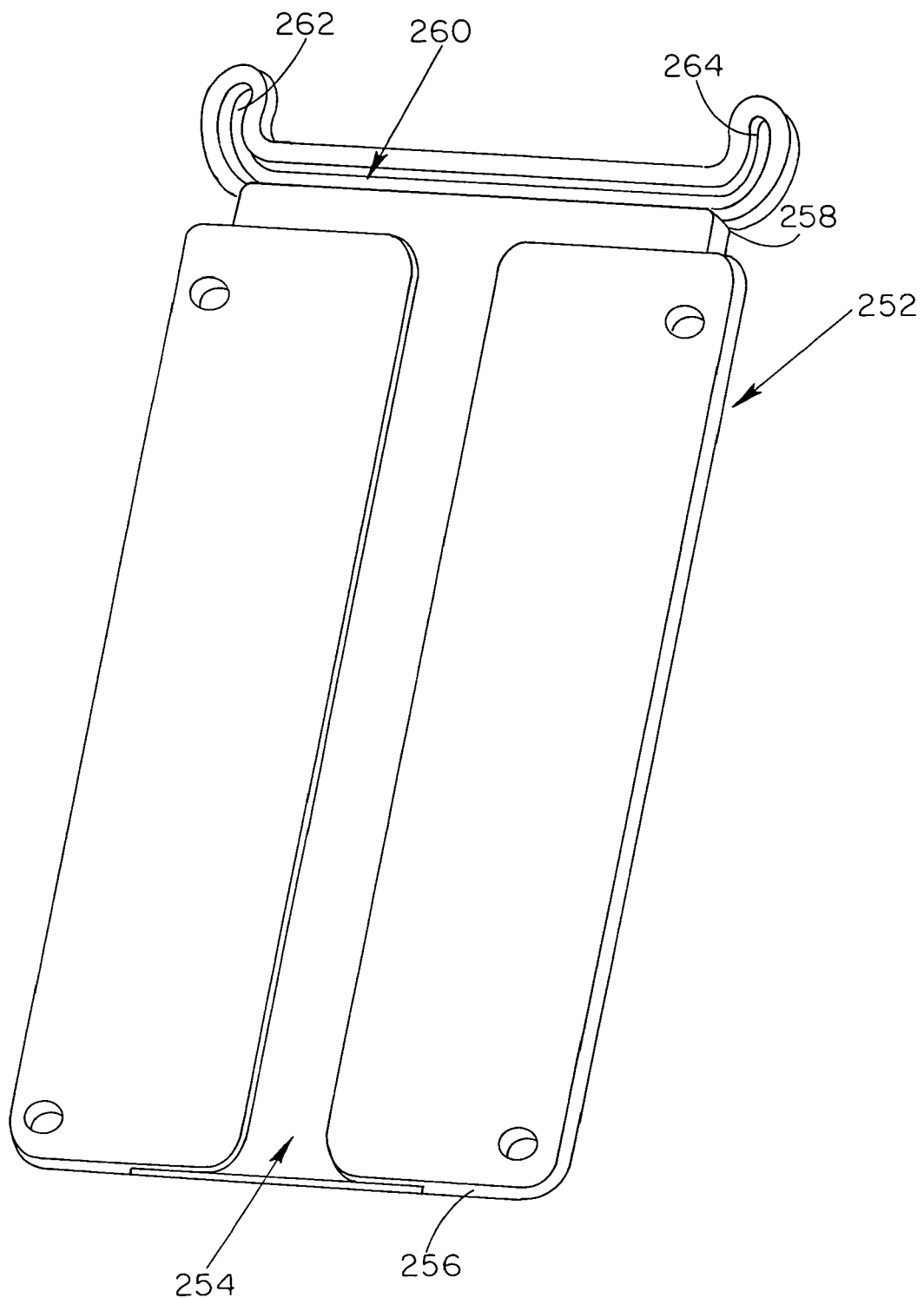
FIG. 11 is an isolation view of a safety strap guide component of a child safety seat of the present invention.

A further aspect and embodiment of the present invention is illustrated in isolation view in FIG. 11, wherein safety strap guide 252 is operably mountable to front surface 11 of seatback 13. Safety strap guide 252 includes an at least partially enclosed channel 254 extending from bottom end 256 to a position adjacent top end 258, which channel 254 is sized and configured to receive safety strap 224 therethrough. Accordingly, safety strap guide 252 retains safety strap 224 in a predefined orientation with respect to front surface 11 of seatback 13.

In addition, safety strap guide 252 preferably further includes an open slot 260 that is in operable alignment with upper aperture 234 of seatback 13 such that safety strap 224 extends through slot 260 and subsequently through upper aperture 234 toward a corresponding LATCH anchoring element. Slot 260 is formed with first and second curved regions 262, 264 to accommodate safety strap 224 when safety seat 12 is rotated about its base unit.

Figure 2:
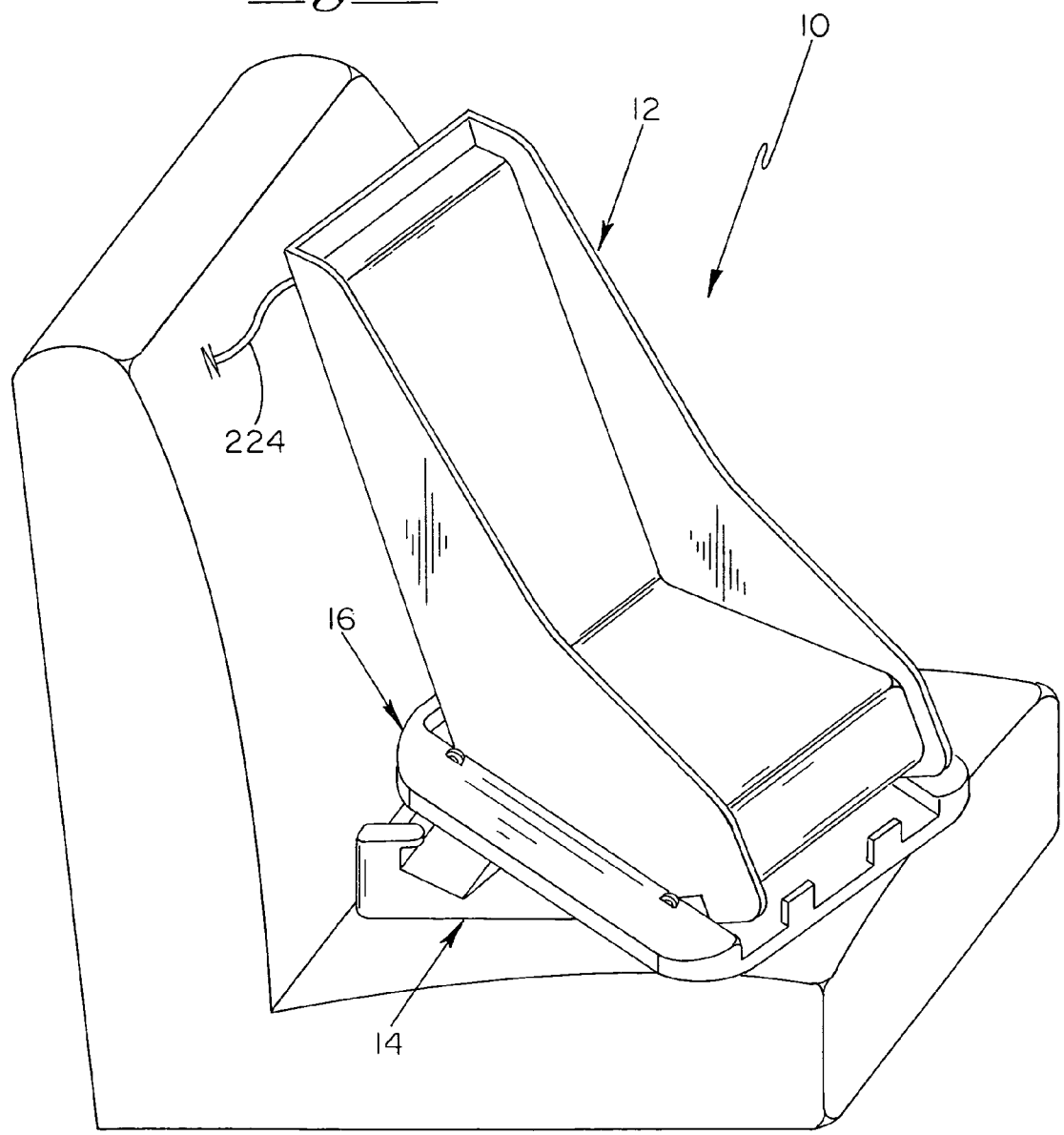
FIG. 2 is a perspective view of the assembly illustrated in FIG. 1, with the child safety seat being rotated from a locked position while engaged with the mounting apparatus of the present invention.

With reference back to FIG. 2, seat 12, in operable combination with interface portion 16, may be operably rotated on a plane parallel to lower surface 17 of interface portion 16. Such rotation enables the user to load and unload the child from seat 12 in a more convenient manner, and without having to detach seat 12 from its mounting base, which, in the present invention, is the combination of interface portion 16 and base portion 14.

In preferred embodiments, seat 12 preferably includes a seat belt apparatus that is configured for operable engagement with appropriately configured receptacles in interface portion 16. Such a seat belt apparatus is commonly incorporated into conventional child and infant safety seats.

Figure 3:
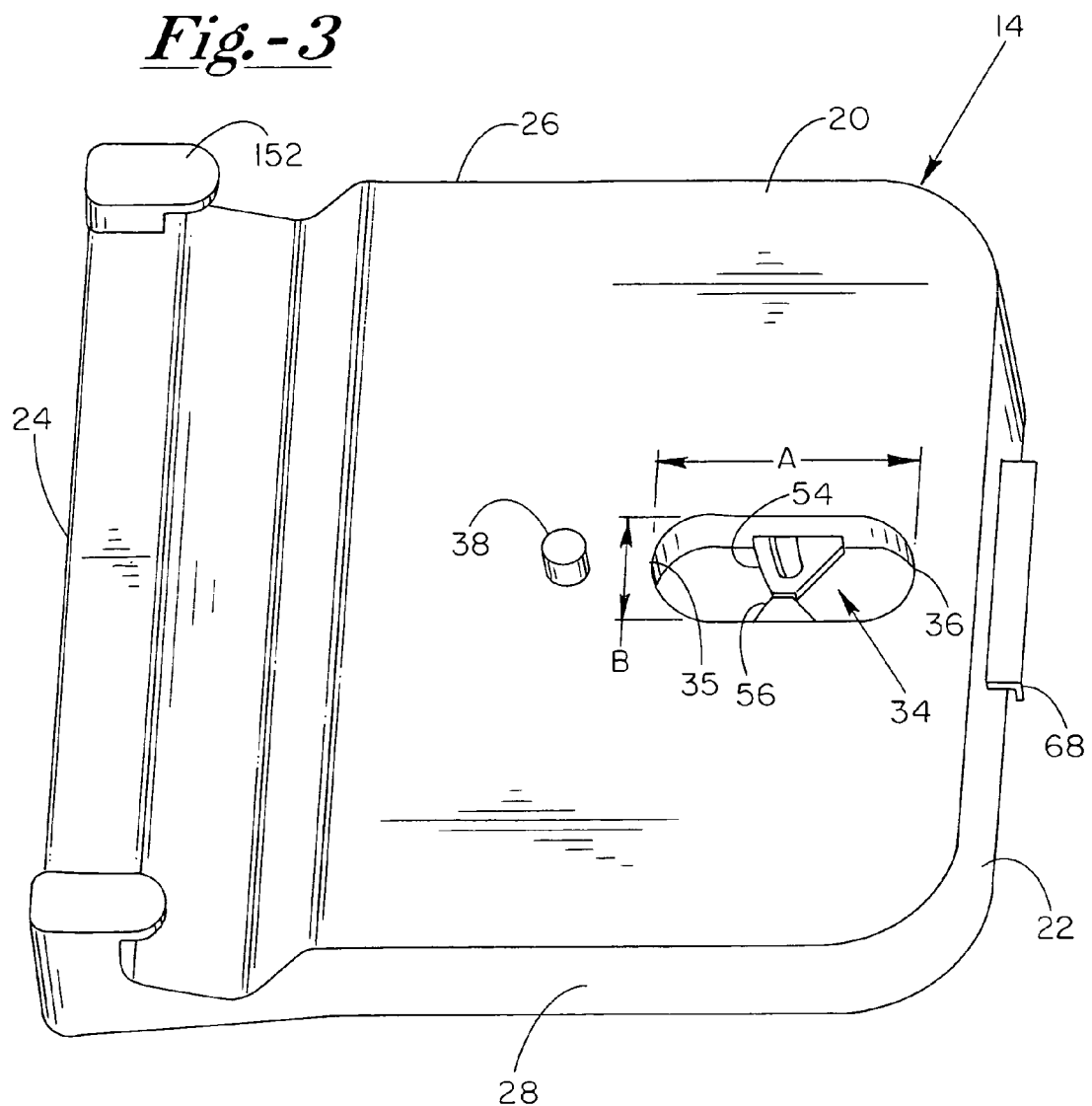
FIG. 3 is an isolation top perspective view of a base structure of the present invention.

An isolation perspective view of base portion 14 is illustrated in FIG. 3. Base portion 14 is generally defined by an upper surface 20, a front end 22, a rear end 24, and opposing sides 26, 28. Upper surface 20 of base portion 14 preferably includes an elongated aperture 34, which aperture 34 has a longitudinal axis "A" extending substantially parallel to sides 26, 28, and a lateral axis "B" extending substantially parallel to front and rear ends 22, 24, respectively. Preferably, the dimension of longitudinal axis "A" is greater than lateral axis "B".

As further illustrated in FIG. 3, upper surface 20 of base portion 14 preferably includes a first guide means 38 disposed thereon and preferably extending upwardly therefrom. Though first guide means 38 may be formed in a variety of configurations, a particular example contemplated by the present invention is that of a protrusion extending substantially perpendicularly upwardly from upper surface 20 of base portion 14. In the embodiments illustrated in FIG. 3, first guide means 38 and elongated aperture 34 are formed along a central longitudinal axis of base portion 14. However, the present invention contemplates the relative positioning of aperture 34 and first guide means 38 in any of a variety of locations in base portion 14.

Figure 4:
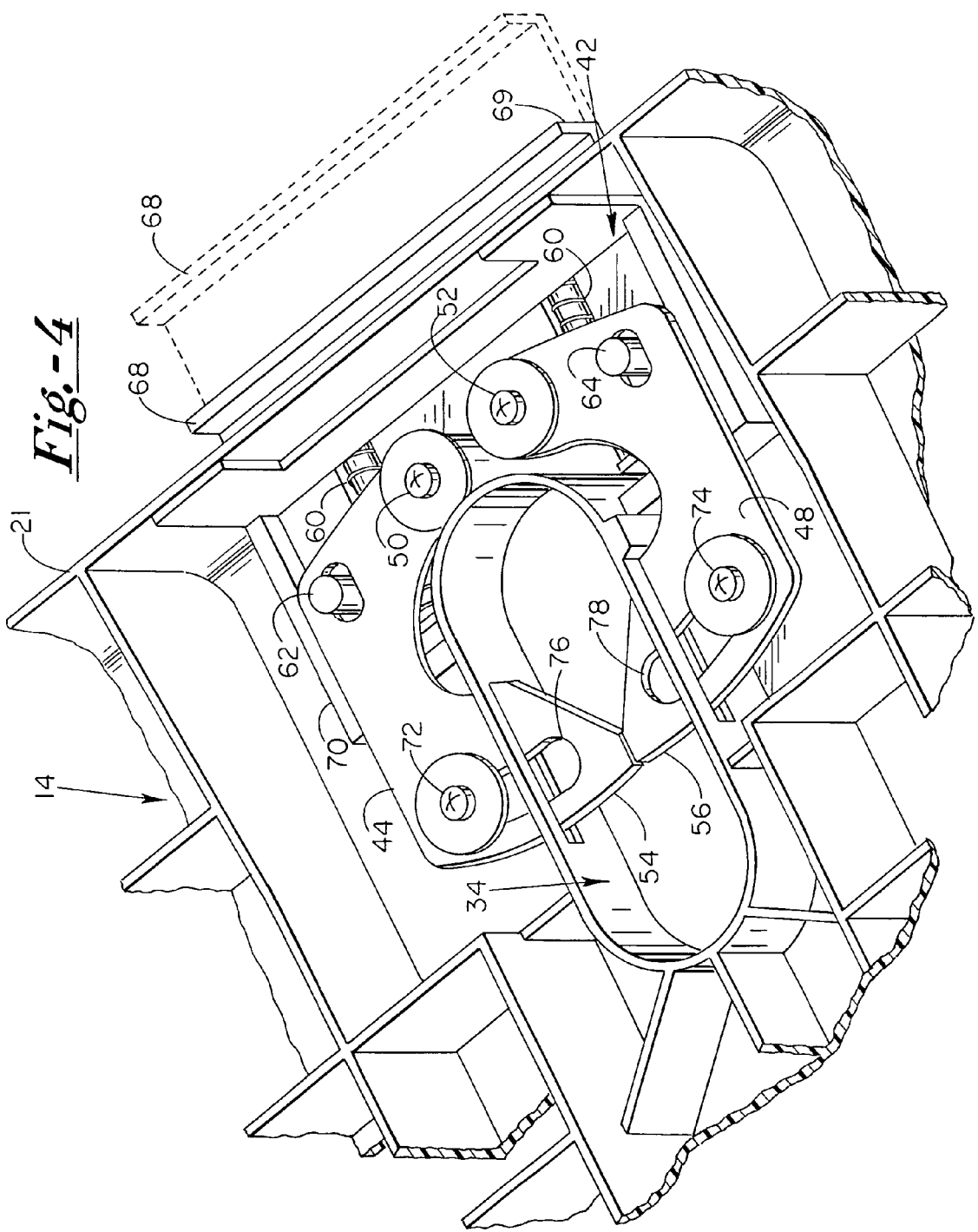
FIG. 4 is a bottom view of the base structure illustrated in FIG. 3.

A bottom view of base portion 14 is illustrated in FIG. 4, which shows a releasable lock mechanism 42 that is engageable in aperture 34. In a particular embodiment of the present invention, releasable lock mechanism 42 includes first and second lock arms 44, 48 that are pivotably mounted about respective pivot points 50, 52, which pivot points 50, 52 provide for pivoting motion of first and second lock arms 44, 48 along a plane substantially parallel to lower surface 21 of base portion 14. Preferably, pivot points 50, 52 comprises threaded rods, bushings, or the like that define respective axes of rotation for first and second lock arms 44, 48.

As shown in FIG. 4, first and second lock arms 44, 48 each include distal ends 54, 56 that are operably urged into contact with one another by biasing means 60, which are configured to deliver bias force to the respective first and second lock arms 44, 48 via respective coupling bodies 62, 64 of manual release unit 68. At the behest of biasing means 60, respective coupling bodies 62, 64 are operably promoted to direct respective first and second lock arms 44, 48 in a direction toward rear end 24 of base portion 14. Since first and second lock arms 44, 48 are anchored to base portion 14 at respective pivot points 50, 52, biasing motion transmitted to first and second lock arms 44, 48 via coupling bodies 62, 64 results in a pivoting of respective lock arms 44, 48 about pivot points 50, 52. Accordingly, respective distal ends 54, 56 of first and second lock arms 44, 48 are naturally urged by biasing means 60 toward one another and ultimately into contact with one another. To assist in facilitating substantially planar pivoting about respective pivot points 50, 52 by first and second lock arms 44, 48, respective position retainers 72, 74 may be provided in the present invention. Such position retainers 72, 74 each include bushings, washers, or the like that are specifically positioned and secured in place by a vertical post such as a threaded screw or the like to thereby retain respective first and second lock arms 44, 48 in a desired level orientation. To accommodate position retainers 72, 74, first and second lock arms 44, 48 preferably include positional slots 76, 78 respectively disposed therein. As a result, first and second lock arms 44, 48 are maintained in a desired positional relationship with position retainers 72, 74 through respective positional slots 76, 78.

In order to effectuate pivotal motion of first and second lock arms 44, 48, biasing means 60 must be manually compressed so as to promote motion of coupling bodies 62, 64 in a direction toward front end 22 of base portion 14. Manual release unit 68 includes an actuator 69 that is coupled to a platform portion 70 thereof through a slot in front end 22 of base portion 14. Platform portion 70 is preferably configured to apply compressive forces to biasing means 60 upon actuation of actuator 69. In a particular embodiment, actuator 69 is a handle that may be pulled outwardly from base portion 14 by a user, which pulling action correspondingly moves platform portion 70 in a direction toward front end 22 of base portion 14, thereby compressing biasing means 60 so as to cause pivoting motion to first and second lock arms 44, 48. Such pivoting of first and second lock arms 44, 48 moves respective distal ends 54, 56 thereof away from one another, thereby releasing the lock established when distal end 54, 56 of first and second lock arms 44, 48 are in contact with one another.

The present invention contemplates a number of configurational variants to releasable lock apparatus 42, so long as such an apparatus provides a similar functionality to that described above. For example, releasable lock apparatus 42 may include only a single pivoting lock arm that extends across lateral axis "B" of aperture 34 when in a fully biased orientation.

Figure 5:
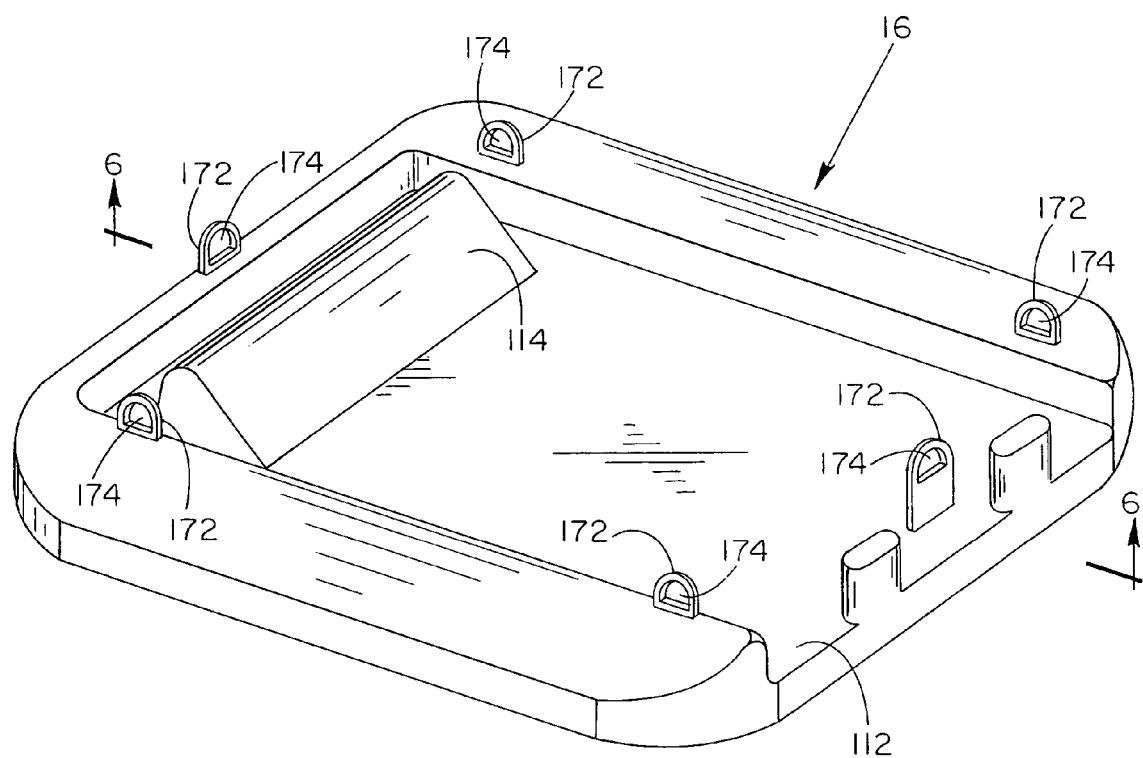
FIG. 5 is an isolation top perspective view of an interface structure of the present invention.

A perspective top view of interface portion 16 is illustrated in FIG. 5. Upper surface 112 of interface portion 16 is preferably specifically configured to matingly engage with conventional vehicular child safety seats in either a forward or rearwardly-facing orientation. For example, intermediate ridge 114 disposed on upper surface 112 is configured to operably receive a clamping portion provided on the bottom sides of conventional vehicular child safety seats. Thus, interface portion 16 acts as a universal receiving platform upon which conventional child safety seats may be operably secured.

Figure 6:
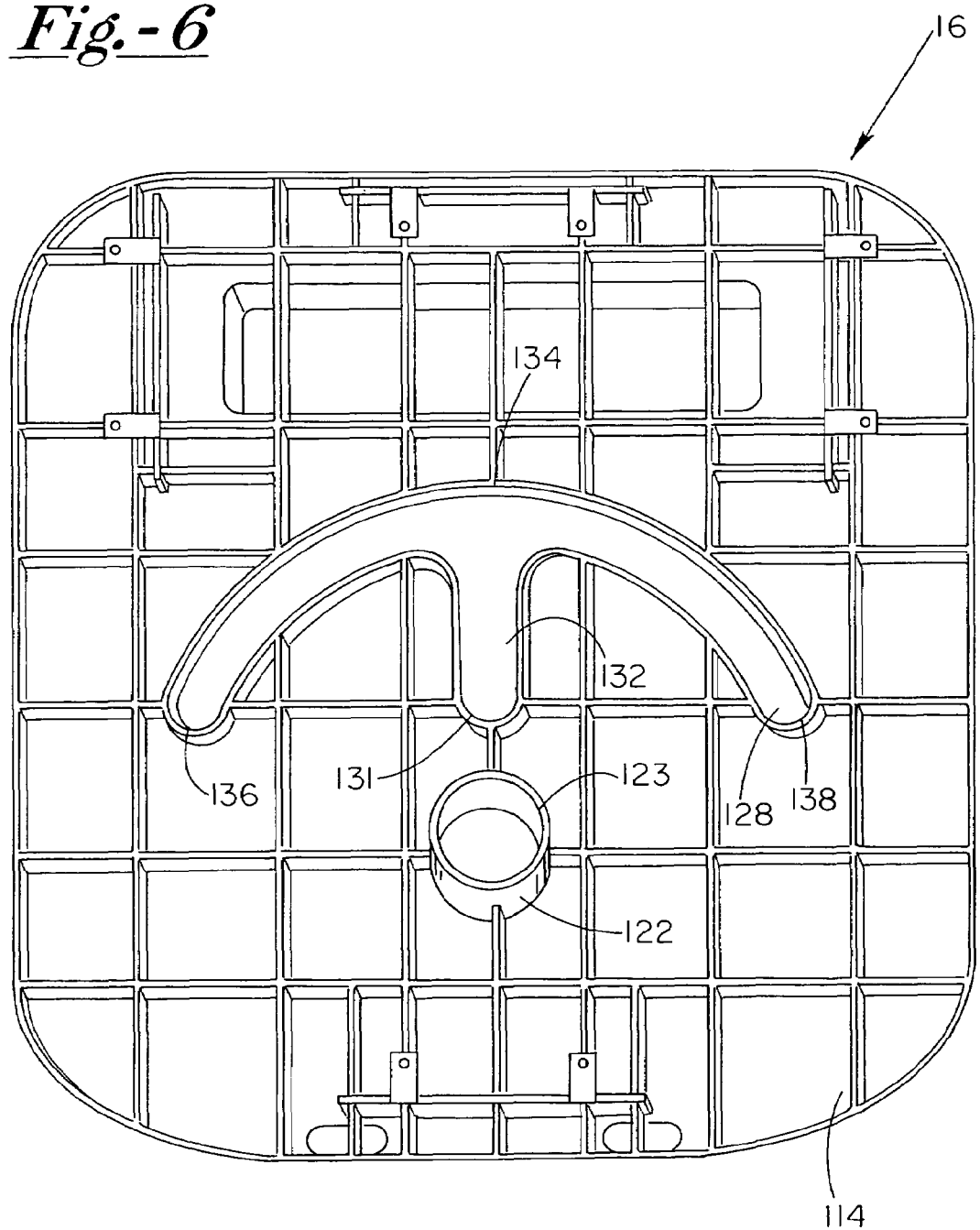
FIG. 6 is a bottom view of the interface structure illustrated in FIG. 5.

A bottom view of interface portion 16 is shown in FIG. 6 having a mating protrusion 122 extending from lower surface 114 of interface portion 16. Mating protrusion 122 is preferably sized and configured to operably engage with aperture 34 by extending therein when interface portion 16 is aligned in superimposed and adjacent relationship with base portion 14. As so aligned, mating protrusion 122 is configured for slidable and rotatable engagement with aperture 34. Accordingly, the diameter of mating protrusion 122 is similar to, but slightly smaller than, lateral axis "B" of aperture 34. Thus, mating protrusion 122 only has freedom to move along longitudinal axis "A", as well as the freedom to rotate within aperture 34 when not locked in place by locking mechanism 42.

Lower surface 114 of interface portion 16 further includes a second guide utility in the form of channel 128 that is configured to matingly engage with first guide means 38 on upper surface 20 of base portion 14. When first guide means 38 is in an engaged relationship within channel 128, rotation of interface portion 16 with respect to base portion 14 causes first guide means 38 to travel within channel 128. Preferably, rotational motion between interface portion 16 and base portion 14, while in an engaged relationship, causes interface portion 16 to progressively displace toward front end 22 of base portion 14. Such displacement is a direct consequence of the two-dimensional parabolic shape of channel 128.

FIGS. 7 and 8 illustrate a top view and a bottom view, respectively, of interface portion 16 in engaged relationship with base portion 14. With reference to FIGS. 6–8, the operational relationship between interface portion 16 and base portion 14 will now be described. A detachable flanged or cap member 130 is preferably removably securable to distal end 123 of mating protrusion 122, with flanged member 130 having a diameter that is larger than lateral axis "B" of aperture 34. In such a manner, flanged member 130 may selectively be secured to mating protrusion 122 from the underside of base portion 14 such that flanged member 130 retains interface portion 16 in juxtaposition with base portion 14 by operably contacting lower surface 21 of base portion 14. Even with flanged member 130 being secured to mating protrusion 122, interface portion 16 remains rotatably and slidably coupled to base portion 14. So long as flanged member 130 is selectively secured to distal end 123 of mating protrusion 122, interface portion 16 is held in adjacent engagement with base portion 14.

With flanged member 130 secured to mating protrusion 122, interface portion 16 is positioned with respect to base portion 14 as is shown in FIGS. 7–8. With releasable lock mechanism 42 being in a fully biased orientation, or locked position, respective distal ends 54, 56 of lock arms 44, 48 bear against mating protrusion 122 and retainably secure mating protrusion 122 between lock arms 44, 48 and rear end 35 of aperture 34. This relative orientation between interface portion 16 and base portion 14 is a "locked" position. Releasable lock mechanism 42 acts to retain the locked position of interface portion 16 on base portion 14 through the configuration of first and second lock arms 44, 48, in that force imparted on distal ends 54, 56 thereof by mating protrusion 122 acts to increase the closing pressure asserted at distal ends 54, 56 of first and second lock arms 44, 48. Specifically, respective distal ends 54, 56 are tapered so that force directed in a direction toward front end 22 of base portion 14 enhances a rotational force generated by biasing means 60 in a locking or closing direction. Accordingly, mating protrusion 122 is maintained in a locked position so long as releasable locking mechanism 42 is not released through the actuation of handle 69.

In addition to the above, the relationship between first guide means 38 and channel 128 is such that when interface portion 16 is in the locked position, first guide means 38 is disposed at a front end 131 of radial portion 132 of channel 128. Accordingly, the lateral walls of channel 128 at end 131 enclose first guide means 38 on three sides, thereby preventing rotational movement of interface portion 16 with respect to base portion 14. The locked position, therefore, retains interface portion 16 in a stationary and fixed relationship with base portion 14.

When handle 69 is actuated to thereby retract biasing means 60 and correspondingly to pivot first and second lock arms 44, 48 out from aperture 34, mating protrusion 122 becomes free to slidably move within aperture 34 toward front end 22 of base portion 14. To enable the rotational capability of the present invention, interface portion 16 is slid forward with respect to base portion 14, such that mating protrusion 122 slidably moves within aperture 34 toward front end 36 of aperture 34. In addition, first guide means 38 correspondingly moves along radial portion 132 of channel 128 toward apex 134. Once first guide means 38 is moved to a position corresponding to apex 134 of channel 128, rotation of interface portion 16 with respect to base portion 14 may be accomplished, as first guide means 38 selectively slidably moves toward one of distal ends 136, 138 of channel 128. Since the above described movement is accomplished between interface portion 16 and base portion 14 while engaged through flanged member 130, the child safety seat need not be removed from interface portion 16 during the sliding and rotating procedures. Accordingly, the child is transported in the safety seat while interface portion 16 is in a locked position with respect to base portion 14, with such a locked position being selectively deactivated through actuation of handle 69 such that interface portion 16, with the child safety seat securely attached thereto, may be rotated into a position convenient for egress and ingress to the seat.

As is illustrated in FIG. 6, channel 128 is preferably configured in a substantially parabolic shape such that rotation of interface portion 16 with respect to base portion 14 causes the corner of interface portion 16 nearest to the automobile seat during such rotation to correspondingly displace forwardly so as to prevent interference between the attached child safety seat and the vehicle seat.

A variety of configurations for channel 128 are contemplated by the present invention, with the parabolic shape illustrated in FIG. 6 being a preferred example for desirably guiding interface portion 16 along with the attached child safety seat during rotation of the child seat with respect to base portion 14. As noted above, the lock/unlock and sliding and rotational procedures are particularly useful when the child safety seat is maintained in a secured engaged relationship with interface portion 16. However, such motions and permutations may be performed without the child safety seat being engaged with interface portion 16, as desired.

The above-describe elements of the present invention are preferably manufactured from lightweight and durable materials that are accepted by governmental safety standards for infant and child vehicular safety seat mounting devices. In some embodiments of the invention, interface portion 16 and base portion 14 are fabricated from polymeric materials such as ABS or high-density polypropylene.

Figure 7A:
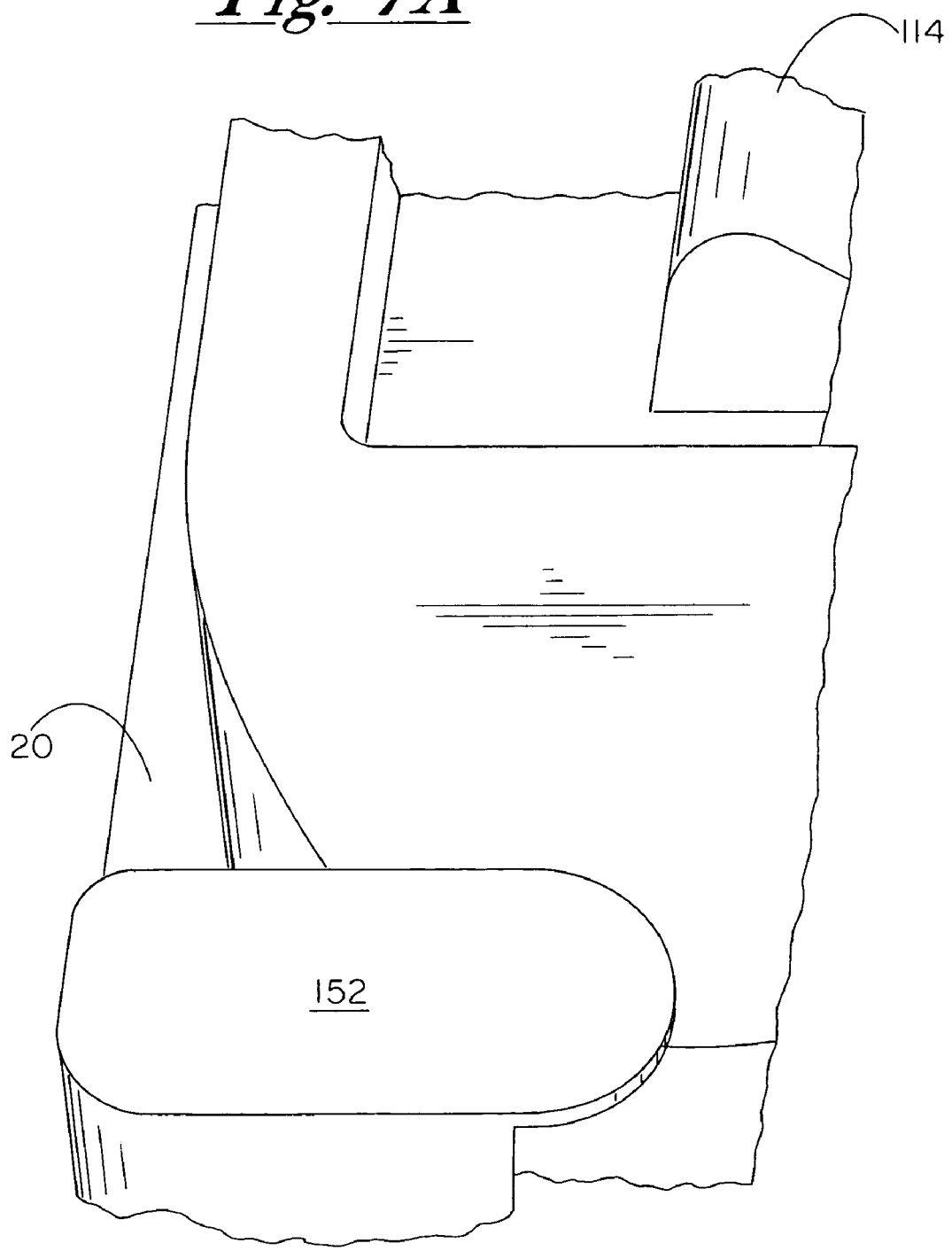
FIG. 7A is an enlarged top perspective view of a portion of that illustrated in FIG. 7.

An additional feature of the present invention is illustrated in FIGS. 7, 7A and 8, which show safety retention features 152 extending upwardly from upper surface 20 of base portion 14. Safety retention features 152 are preferably configured and spaced from upper surface 20 of base portion 14 so as to operably grasp interface portion 16. In such a manner, safety retention features 152 act to further operably retain interface portion 16 in a secure adjacent relationship with base portion 14. In particular, safety retention features 152 preferably assist in clamping the rear end of interface portion 16 down to base portion 14, and prevent undesired lifting or disengagement of interface portion 16 from base portion 14 in the event of a substantial lifting force upon interface portion 16, such as in the event of a vehicular accident wherein the weight of the child safety seat carries sufficient momentum so as to act to lift interface portion 16 from base portion 14. Since base portion 14 is secureably held in place to the vehicle seats via seat belt anchors and the like, safety retention features 152 preferably operably retain interface portion 16 in a desired engaged relationship with base portion 14, even in the event of a relatively large disengaging force applied. In preferred embodiments of the present invention, safety retention features 152 are integrally formed with base portion 14. Preferably, safety retention features 152 are co-molded with base portion 14.

A still further aspect of the present invention is illustrated in FIGS. 5 and 7, which show anchoring means 172 extending upwardly from interface portion 16, with such anchoring means 172 each including at least one tie aperture 174 disposed therethrough and in a portion thereof above upper surface 112 of interface portion 16. Such anchoring means 172 are preferably mounted at lower surface 114 of interface portion 16, and are utilized to receive one or more tie straps (not shown) for operably anchoring items such as the child safety seat to interface portion 16. In some embodiments of the present invention, anchoring means 172 are integrally formed with interface portion 16 and extend upwardly from upper surface 112 thereof. Anchoring means 172 are preferably fabricated from a strong material such as steel or the like.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A rotatable child safety seat apparatus for use in combination with a vehicular seat, said rotatable child safety seat apparatus comprising:
    (a) a seat rotation mechanism operably enabling selective rotation of a seat portion of said rotatable child safety seat apparatus with respect to a base portion of said rotatable child safety seat apparatus along a generally horizontal plane; and
    (b) a retractable harnessing means for securing said rotatable child safety seat apparatus to said vehicular seat, said retractable harnessing means having a safety strap retractably extending out from a strap housing, and being integrally mounted within said seat portion and including an automatic locking means for responsively locking said safety strap in a fixed degree of extension from said housing upon incursion of a sudden force urging said safety strap out from said housing, said retractable harnessing means enabling the selective rotation of said seat portion while said harnessing means is engaged with said vehicular seat.

2. A rotatable child safety seat apparatus as in claim 1 wherein a first end of said safety strap is specifically configured for mating engagement with LATCH receptacles.

3. A rotatable child safety seat apparatus as in claim 1 wherein:
    (a) said base portion includes an upper surface, a front end, a rear end, and opposing sides connecting said front and rear ends, said base portion further including an elongated aperture extending therethrough from said upper surface to a lower surface, with said aperture having a longitudinal axis extending substantially parallel to said sides, and a lateral axis extending substantially parallel to said front and rear ends, with said longitudinal axis being longer than said lateral axis, said base portion further including a first guide means disposed on said upper surface thereof, and a releasable lock means; and
    (b) an interface means that is removably and rotatably engageable with said base portion, said interface means having a mating means extending from a lower surface thereof, said mating means being configured for operable, slidable, and rotatable engagement with said aperture to thereby removably secure said interface means to said base portion, said interface means further including a second guide means on said lower surface thereof that is matingly engageable with said first guide means such that relative rotational motion between said interface means and said base portion while said first and second guide means are operably engaged with one another, causes said interface means to progressively displace towards said front end of said base portion, an upper surface of said interface means being specifically configured to operably and retainably receive said seat portion thereto.

4. A child safety seat apparatus for use in combination with a vehicular seat, said child safety seat apparatus comprising:
    (a) a child safety seat having a retractable harnessing means for securing said child safety seat to said vehicular seat, said retractable harnessing means having a safety strap retractably extending out from a strap housing and being integrally mounted within said child safety seat, said child safety seat including an automatic locking means for responsibly locking said safety strap in a fixed degree of extension from said housing upon incursion of a sudden force urging said safety strap out from said housing; and
    (b) a rotatable mounting apparatus that is specifically configured for removable mating engagement with said child safety seat, with the rotatable mounting apparatus including:
        (i) a base means having an upper surface, a front end, a rear end, and opposing sides connecting said front and rear ends, said base means further including an elongated aperture extending therethrough from said upper surface to a lower surface, with said aperture having a longitudinal axis extending substantially parallel to said sides, and a lateral axis extending substantially parallel to said front and rear ends, with said longitudinal axis being longer than said lateral axis, said base means further including a first guide means disposed on said upper surface thereof, and a releasable lock means; and
        (ii) an interface means that is removably and rotatably engageable with said base means, said interface means having a mating means extending from a lower surface thereof, said mating means being configured for operable, slidable, and rotatable engagement with said aperture to thereby removably secure said interface means to said base means, said interface means further including a second guide means on said lower surface thereof that is matingly engageable with said first guide means such that relative rotational motion between said interface means and said base means while said first and second guide means are operably engaged with one another, causes said interface means to progressively displace towards said front end of said base means, an upper surface of said interface means being specifically configured to operably and retainably receive said child safety seat thereto.

* * * * *